US008566383B2

(12) United States Patent
Dao et al.

(10) Patent No.: US 8,566,383 B2
(45) Date of Patent: Oct. 22, 2013

(54) DISTRIBUTED RESIDUE-CHECKING OF A FLOATING POINT UNIT

(75) Inventors: Son Trong Dao, Stuttgart (DE); Juergen Georg Haess, Schoenaich (DE); Michael Klaus Kroener, Ehningen (DE); Silvia Melitta Mueller, Altdorf (DE); Jochen Preiss, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1152 days.

(21) Appl. No.: 12/253,713

(22) Filed: Oct. 17, 2008

(65) Prior Publication Data

US 2010/0100578 A1    Apr. 22, 2010

(51) Int. Cl.
*G06F 11/08*    (2006.01)

(52) U.S. Cl.
USPC ............................................................ 708/532

(58) Field of Classification Search
None
See application file for complete search history.

(56) References Cited

U.S. PATENT DOCUMENTS

| | | | |
|---|---|---|---|
| 3,814,923 A * | 6/1974 | Wang | 708/532 |
| 3,816,728 A * | 6/1974 | Chen et al. | 708/532 |
| 3,873,820 A * | 3/1975 | Parr et al. | 708/532 |
| 4,190,893 A | 2/1980 | Gajski | |
| 4,538,237 A | 8/1985 | Circello | |
| 4,926,374 A | 5/1990 | Schaffer | |
| 7,058,830 B2 | 6/2006 | Dhong et al. | |
| 7,137,021 B2 | 11/2006 | Dhong et al. | |
| 7,376,890 B2 * | 5/2008 | Busaba et al. | 714/808 |
| 7,769,795 B1 * | 8/2010 | Iacobovici | 708/233 |
| 8,024,647 B2 * | 9/2011 | Busaba et al. | 714/808 |
| 2005/0278572 A1 * | 12/2005 | Busaba et al. | 714/27 |
| 2008/0162618 A1 * | 7/2008 | Busaba et al. | 708/532 |
| 2010/0146027 A1 * | 6/2010 | Dao et al. | 708/491 |

FOREIGN PATENT DOCUMENTS

EP    0 374 420    6/1990

* cited by examiner

*Primary Examiner* — David H Malzahn
(74) *Attorney, Agent, or Firm* — Cantor Colburn LLP; John Campbell

(57) ABSTRACT

A distributed residue checking apparatus for a floating point unit having a plurality of functional elements performing floating-point operations on a plurality of operands. The distributed residue checking apparatus includes a plurality of residue generators which generate residue values for the operands and the functional elements, and a plurality of residue checking units distributed throughout the floating point unit. Each residue checking unit receives a first residue value and a second residue value from respective residue generators and compares the first residue value to the second residue value to determine whether an error has occurred in a floating-point operation performed by a respective functional element.

13 Claims, 2 Drawing Sheets

DISTRIBUTED RESIDUE-CHECKING OF A FLOATING POINT UNIT

This invention was made with Government support under Contract No.: HR0011-07-9-0002 awarded by DARPA. The Government has certain rights to this invention.

BACKGROUND

The present invention relates to residue-checking a floating point unit (FPU) of a microprocessor, and more specifically, to distributed residue-checking of an FPU while power-saving data flow elements within the FPU.

A conventional FPU of a microprocessor typically includes a residue checking apparatus which performs residue checking for detecting errors in arithmetic floating-point operations such as addition, subtraction, multiplication, division, square root or convert operations. The residue checking is performed within a checking flow by performing the same operations on the residue as those performed on the operands of the FPU. That is, a checking flow is performed in parallel to a data flow within the FPU. In FIG. 1, a data flow 1 and a checking flow 2 of a conventional residue checking apparatus for a FPU is shown. Operands A, B and C are provided by an input register 3 in the data flow 1. The operands A, B and C are processed differently based on different functional elements 4 e.g., an aligner 21 and a normalizer 22, and a result is provided by a result register 5. Residues are generated at specified positions within the data flow 1 by residue generators 6. Modulo decoders 7 are connected to the residue generators 6 and provide residue modulos to different functional elements 8 such as a modulo multiplier 16, modulo adder 17, modulo subtract 18, modulo multiplier 19, and modulo subtract 20 within the checking flow 2. In the first stage 10 of the checking flow 2, the residue modulos of operands A and B are multiplied by the modulo multiplier 16. In the second stage 11, the residue modulo from operand B is added to the product-residue modulo from stage 10 via the modulo adder 17. In the third stage 12, the residue modulo of bits lost at the aligner 21 is subtracted by the modulo subtract 18 from the sum of the second stage 11. In the fourth stage 13, residue multiplication with a constant to compensate for normalized-shift is performed by the modulo multiplier 19. Then, in the fifth stage 14, a residue-subtract of bits lost at the normalizer 22 is performed by the modulo subtract 20. In the sixth stage 15, a single check operation is performed by a compare element 9. The compare element 9 compares the result provided by the modulo subtract 20 with the residue modulo of the result provided by the result register 5 of the data flow 1.

Power consumption of microprocessors is an important concern. FPUs consume a notable amount of power of the microprocessors. Therefore, power-saving techniques are employed to reduce the amount of power consumed by the FPUs within the microprocessors. Several problems occur in the conventional residue checking apparatus when power-saving techniques are employed. For example, since a single check is performed as shown in FIG. 1, the conventional residue checking apparatus is inoperable while power saving for some of the data flow elements by temporarily turning off their clocking. The single check also needs to be disabled completely in case of timing problems of the checking circuitry. In addition, a point of failure may not be identified, and the conventional residue checking apparatus may not be usable for complex operations within a multi-cycle pass such as divide, square root, and extended precision operations.

SUMMARY

According to one embodiment of the present invention, a distributed residue checking apparatus for a floating point unit having a plurality of functional elements performing floating-point operations on a plurality of operands is provided. The distributed residue checking apparatus includes a plurality of residue generators which generate residue values for the operands and the functional elements, and a plurality of residue checking units distributed throughout the floating point unit. Each residue checking unit receives a first residue value and a second residue value from respective residue generators and compares the first residue value to the second residue value to determine whether an error has occurred in a floating-point operation performed by a respective functional element.

According to another embodiment, a method of distributed residue checking a floating point unit having a plurality of functional elements performing floating-point operations on a plurality of operands is provided. The method includes generating residue values for the operands and the functional elements via a plurality of residue generators, distributing a plurality of residue checking units through the floating point unit, and receiving and comparing, via each residue checking unit, a first residue value and a second residue value from respective residue generators to determine whether an error has occurred in a floating-point operation performed by a respective functional element.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
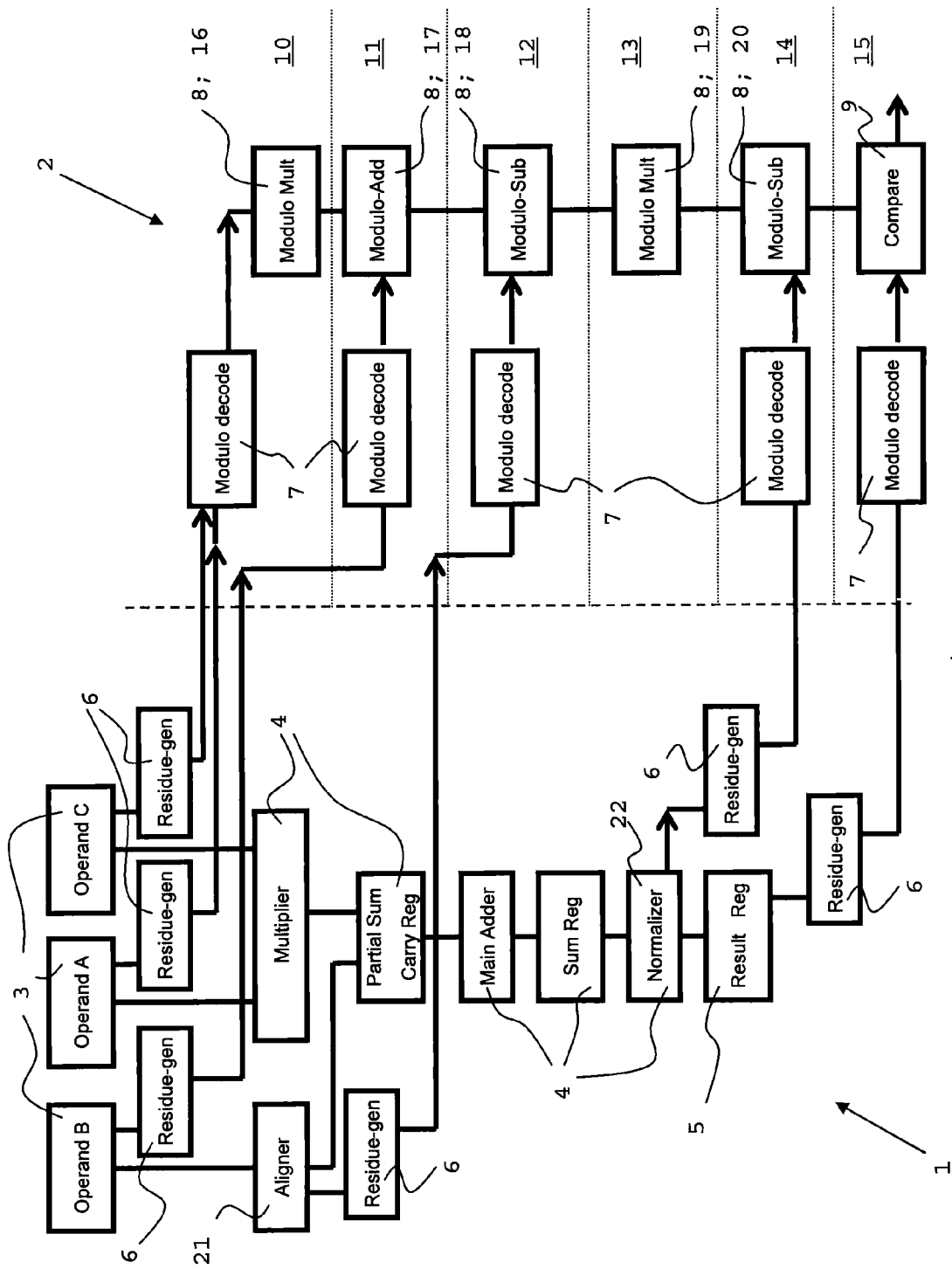
FIG. 1 is a schematic diagram illustrating a conventional residue checking apparatus.
Figure 2:
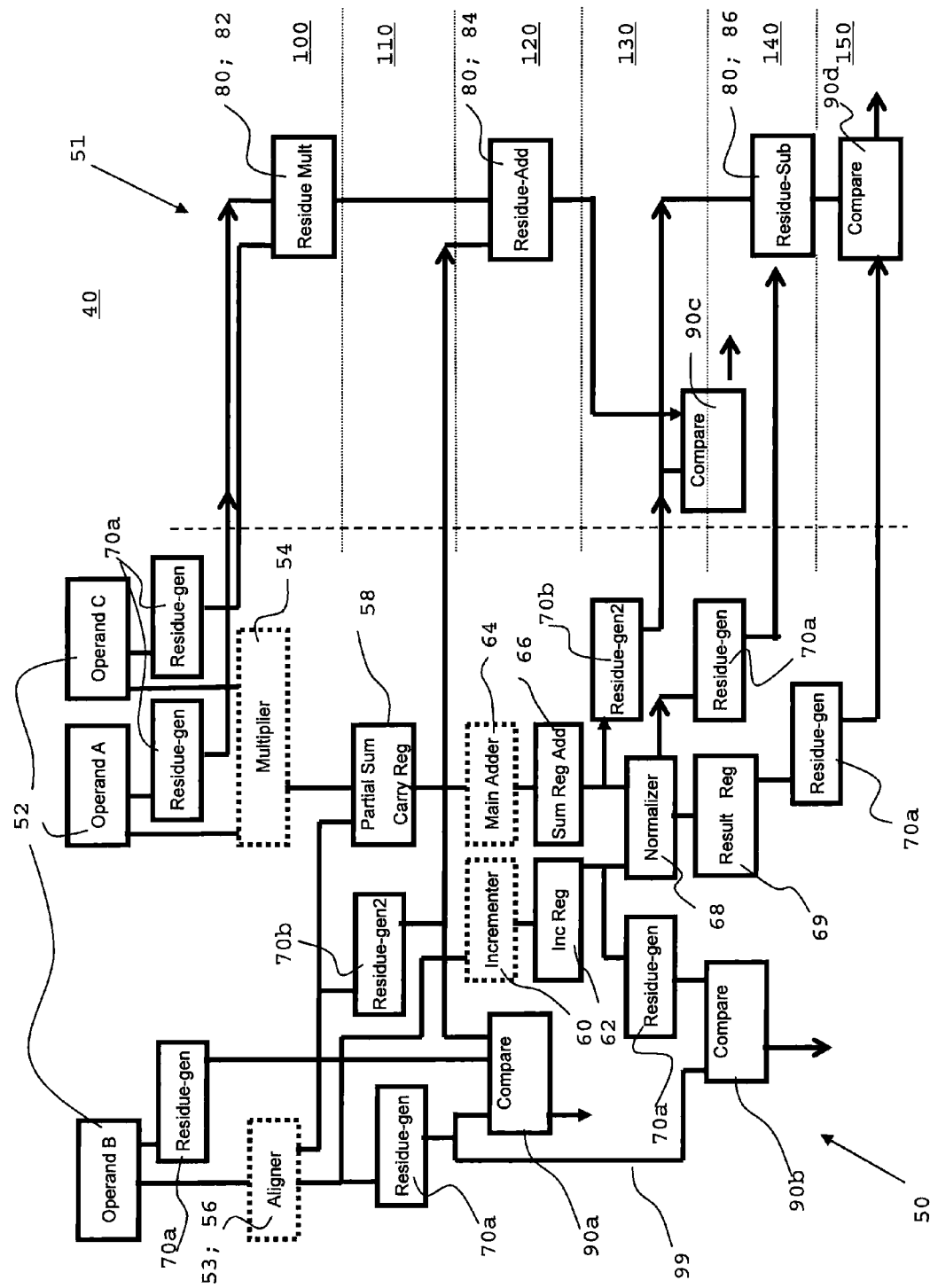
FIG. 2 is a schematic diagram illustrating a distributed residue checking apparatus that can be implemented within embodiments of the present invention.

With reference now to FIG. 2, there is a distributed residue checking apparatus that can be implemented within an embodiment of the present invention. As shown in FIG. 2, a distributed residue checking apparatus for a floating point unit (FPU) 40 is provided. As shown in FIG. 2, a data flow 50 and a checking flow 51 (to be described later) are illustrated. In the data flow 50, a plurality of operands A, B and C are input via an input register 52. A plurality of functional elements 53 is also provided to perform floating-point operations on the plurality of operands A, B and C. According to one embodiment, the functional elements 53 include a multiplier 54, an aligner 56, a partial sum and carry register 58, an incrementer 60, an incrementer register 62, a main adder 64, a sum register 66 for the adder 64 and a normalizer 68. According to an embodiment of the present invention, the multiplier 54, the aligner 56, the incrementer 60 and the main adder 64 (as outlined by a dashed line in FIG. 2) may be switched off to enable power-saving within the FPU 40 upon instruction. Additional details concerning power-saving of these data flow elements will be discussed below.

Further, according to an embodiment of the present invention, the data flow 50 includes a plurality of residue generators 70a and 70b that generate residue values within the FPU 40. The residue values are generated by the residue generators 70a and 70b at specified positions within the data flow 50. According to an embodiment of the present invention, the residue generators 70a have approximately 64 bits data flow capacity and the residue generators 70b have approximately 128 bits, for example. That is, the residue generators 70b have a wider data flow capacity than that of the residue generators 70a, to thereby accommodate the output of the aligner 56. The present invention is not limited to hereto, and may vary as necessary.

In the data flow 50, operands A, B and C are input via the input register 52 in parallel. As shown in FIG. 2, operands A and C are multiplied via the multiplier 54, while operand B which is to be added to the results of the multiplier 54 at a later pipeline stage, is input into and shifted via the aligner 56. Residue values of the operands A, B, C are generated by respective residue generators 70a. The results at the aligner 56 and the results from the multiplier 54 are then input to the partial sum and carry register 58. The results of the aligner 56 and the multiplier 54 are added together in the main adder 64 and the sum is placed in the sum register add 66. Residue values of the aligner 56 are generated by respective residue generators 70a and 70b.

As further shown in FIG. 2, the results of the aligner 56 are also input into and incremented via the incrementer 60 based on instructions provided. The results of the incrementer 60 are then input into the incrementer register 62. The results of the incrementer register 62 and the sum register add 66 are input into the normalizer 68 which performs a normalization operation such that the normalizer 68 receives data expressed in scientific notation and adjust the mantissa and exponent such that the mantissa has a one in the leading digit. Residue values of the results of the incrementer register 62 and the sum register add 66 are generated by respective residue generators 70a and 70b. The results of the normalizer 68 are then input into a result register 69 and residue values of the normalizer and the result register 69 are then generated at a respective residue generator 70a. According to an embodiment of the present invention, the distributed residue checking apparatus performs distributed residue checking operations of the residue values generated by the residue generators 70a and 70b. Details concerning the distributed residue checking operations will now be described.

According to an embodiment, the distributed residue checking apparatus includes a plurality of residue checking units including a first residue checking unit 90a, a second residue checking unit 90b, a third residue checking unit 90c and a fourth residue checking unit 90d, distributed throughout the data flow 50 and the checking flow 51 of the FPU 40. Each residue checking unit 90a through 90d receives a first residue value and a second residue value from respective residue generators 70a or 70b, compares the first residue value to the second residue value to determine whether the first and second residue values are equal. The respective residue checking unit 90a, 90b, 90c or 90d produces an error signal, when the first and second residue values are not equal, which indicates an error has occurred during performance of the floating-point operation performed by the respective functional element 53.

As shown in FIG. 2, the first residue checking unit 90a compares the residue value from the operand B to the residue value resulting from the aligner 56. The present invention is not limited to using a residue value of an operand. Alternatively, the result of the multiplication of two operands or any other intermediate residue-value, for example, may be used.

According to one embodiment, the residue value resulting from one fundamental element 53 and input into a residue checking unit in one pipeline stage may also be input into another residue checking unit in a subsequent pipeline stage. This eliminates the need for an additional residue generator as input reference for a later pipeline stage residue comparator. For example, the residue value result of the aligner 56 used by the first residue checking unit 90a in one pipeline stage is also forwarded to the second residue checking unit 90b to be used in the next pipeline stage (as indicated by the reference line 99). Thus, approximately one clock cycle later, the second residue checking unit 90b compares the residue value of the aligner 56 to the residue value of another fundamental element 53 (i.e., the incrementer 62) to determine whether the data is correct.

According to an embodiment of the present invention, in the checking flow 51, a plurality of residue arithmetic elements 80 are provided to perform residue arithmetic operations on the residue values generated by the residue generators 70a and 70b. The residue calculating elements 80 may include a residue multiplier 82, a residue add 84 and a residue subtract 86, for example. The present invention is not limited hereto, and may vary as necessary. The residue arithmetic elements 80 are used to verify calculations performed by the multiplier 54 and the main adder 64, for example.

At a first stage 100 of the checking flow 51, the residue values of the operands A and C are first multiplied via the residue multiplier 82. Next, in the second stage 110, the product of the residue multiplier 82 and the residue value of the aligner 56 are forwarded, and in the third stage 120 the product of the residue multiplier 82 and the residue value of the aligner 56 are added via the residue add 84. In the fourth stage 130, the residue value of the main adder 64 and the results of the residue add 84 are compared via the third residue checking unit 90c to check the accuracy of the multiplier 54 and the main adder 64.

In the fifth stage 140, the residue value of the data bits lost in the normalizer 68 is subtracted from the residue value of the main adder 64 via the residue subtract 86. In the sixth stage 150, the results of the residue subtract 86 are then compared to the residue value from the result register 69 via the fourth residue checking unit 90d.

According to an embodiment of the present invention, a number of the residue checking units 90a through 90d are independent from the remaining residue checking units 90a through 90d. For example, according to one embodiment, the first and second residue checking units 90a and 90b are independent from the third and fourth residue checking units 90c and 90d. Additional details regarding the operation of the residue checking units 90a through 90d while power-saving some of the functional elements 53 will now be described.

According to an embodiment of the present invention, the residue checking units 90a through 90b remain operable while power-saving techniques are performed in the FPU 40. For example, since the path of the multiplier 54 is independent from the path of the aligner 56, clock disable logic (not shown) may be employed by the FPU 40 to dynamically turn on and off the multiplier 54 and the aligner 56, for example. In one embodiment, when the multiplier is switched off to save power, the first checking unit 90a and second checking unit 90b continue to perform a residue check of the residue value of the aligner 56, for example. In another embodiment, when the aligner 56 is switched off, the first residue checking unit 90a and the second residue checking unit 90b are disabled while the third and fourth residue checking units 90c and 90d remain operable and continue checking the remaining floating point operations. Therefore, the distributed residue checking apparatus is capable of identifying points of failure in the FPU 40, and enables the adjustment of clocking of an affected functional element 53, for example.

The distributed residue checking apparatus according to embodiments of the present invention includes residue checking units which may operate independently from each other and are self-contained, and conducts distributed residue checking of floating point operations performed by functional elements within an FPU and forwards residue information from one pipeline stage to be used in a subsequent pipeline stage. Therefore, the present invention provides the advantages of continuing the operation of residue checking while power-saving of the data flow elements, and saving in hardware component costs by using the same residue values from the same residue generators in subsequent pipeline stages within the FPU. The present invention also provides the advantages of identifying point of failures within the data flow 50 to allow for repair actions and the distributed residue checking apparatus is usable for complex operations with multi-cycle pass (e.g., divide/square root/extended operations) through a pipeline.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of distributed residue checking a floating point unit having a plurality of functional elements performing floating-point operations on a plurality of operands, the method comprising:
   generating, by a plurality of residue generators, residue values for the plurality of operands and the plurality of functional elements;
   receiving, by a first residue checking unit in a plurality of residue checking units where each residue checking unit of the plurality of residue checking units is coupled to a corresponding residue generator, a first residue value generated by a first functional element of the plurality of functional elements from a first residue generator in a plurality of residue generators and a second residue value from a second residue generator in the plurality of residue generators;
   comparing, by the first residue checking unit, the first residue value to the second residue value in a first pipeline stage;
   determining whether an error has occurred in a floating point operation performed by the first functional element in the plurality of functional elements by the first residue checking unit, the determining based on the comparing of the first residue value to the second residue value;
   receiving, by a second residue checking unit in the plurality of residue checking units, the first residue value from the first residue generator and a third residue value from a third residue generator in the plurality of residue generators; and
   comparing, by the second residue checking unit, the first residue value to the third residue value in a subsequent pipeline stage;
   determining whether an error has occurred in a floating point operation performed by a second functional element in the plurality of functional elements by the second residue checking unit, the determining based on the comparing of the first residue value to the third residue value.

2. The method of claim 1, wherein a number of the residue checking units operate independent form other residue checking units.

3. The method of claim 1, further comprising: based on switching off one of the functional elements for power-saving, disabling a residue checking unit which receives a residue value from the functional element that is switched off and performing residue checking of remaining functional elements by remaining residue checking units of the plurality of residue checking units.

4. The method of claim 1, further comprising:
   performing, by residue arithmetic elements, residue arithmetic operations on residue values generated by residue generators in the plurality of residue generators, wherein the residue arithmetic operations are the floating point operations performed by the functional elements; and
   comparing, by residue checking units, residue results of the residue arithmetic operations to residue values of the functional elements for determining whether errors have occurred in the floating point operations performed by the functional elements.

5. A computer system for performing floating point operations, the system comprising:
   a floating point unit having a plurality of functional elements performing floating point operations on a plurality of operands and a distributed residue checking apparatus coupled to the plurality of functional elements, the distributed residue checking apparatus comprising:
   a plurality of residue generators generating residue values for the plurality of operands and the plurality of functional elements; and
   a plurality of residue checking units, each residue checking unit of the plurality of the plurality of residue checking units coupled to a corresponding residue generator, the floating point unit configured for performing a method comprising:
   determining whether an error has occurred by a first residue checking unit in a floating point operation based on a first residue value generated by a first functional element of the plurality of functional elements, the first residue checking unit receiving the first residue value generated by the first functional element from a first residue generator in the plurality of residue generators and a second residue value from a second residue generator in the plurality of residue generators and comparing the first residue value to the second residue value in a first pipeline stage for determining whether the error has occurred in the floating point operation performed by the first functional element; and determining whether an error has occurred by a second residue checking unit in a floating point operation performed by a second functional element in the plurality of functional elements, the second residue checking unit receiving the first residue value from the first residue generator and a third residue value from a third residue generator in the plurality of residue generators and comparing the first residue value to the third residue value in a subsequent pipeline stage for determining whether the error has occurred in the floating point operation performed by the second functional element.

6. The computer system of claim 5, wherein a number of the residue checking units operate independent from remaining residue checking units of the plurality of residue checking units.

7. The computer system of claim 6, wherein based on switching off one of the functional elements for power-saving, a residue checking unit receiving a residue value from the functional element that is switched off is disabled and the remaining residue checking units of the plurality of residue checking units continue performing residue checking of remaining functional elements in the floating point unit.

8. The computer system of claim 5, further comprising a plurality of residue arithmetic elements configured for performing a method comprising:

receiving residue values generated by residue generators in the plurality of residue generators, performing residue arithmetic operations on the generated residue values, wherein the residue arithmetic operations are the floating point operations performed by the functional elements, and comparing, by residue checking units, residue results of the residue arithmetic operations to residue values of the functional elements for determining whether errors have occurred in the floating point operations performed by the functional elements.

9. The computer system of claim 8, wherein the functional elements comprise a multiplier, an aligner, an incrementer and an adder.

10. The computer system of claim 9, wherein the plurality of residue arithmetic elements include a residue multiplier, a residue adder and a residue subtract, and based on verifying the floating point operation of the multiplier, the residue values of a first operand and a second operand are input into a residue multiplier and a third operand is input into the aligner, and results of the aligner and the multiplier are input into the adder, the residue multiplier multiplies the residue values of the first and second operand and the residue adder adds the residue value of the aligner to a product of the residue multiplier, and a respective residue checking unit compares the results of the residue adder to a residue value of the adder.

11. The computer system of claim 10, wherein a residue checking unit of the plurality of residue checking units compares a residue value of the third operand input into the aligner and a residue value resulting from the floating-point operation performed by the aligner.

12. The computer system of claim 11, wherein a residue checking unit of the plurality of residue checking units compares a same residue value resulting from the aligner to a residue value of the incrementer.

13. The computer system of claim 12, wherein the functional elements further comprise a normalizer, wherein a residue generator generates a residue value of the normalizer and the residue value of the normalizer is subtracted from the residue value of the adder via the residue subtract, and a result of the residue subtract is compared to a residue value of a result register via a residue checking unit of the plurality of residue checking units.

* * * * *